(12) United States Patent
Hu et al.

(10) Patent No.: US 9,335,450 B2
(45) Date of Patent: May 10, 2016

(54) OPTICAL ELEMENT AND METHOD FOR MANUFACTURING THE SAME

(71) Applicant: HON HAI PRECISION INDUSTRY CO., LTD., New Taipei (TW)

(72) Inventors: Chau-Jin Hu, New Taipei (TW); Jia-Ming Wang, New Taipei (TW); Chun-Yu Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 211 days.

(21) Appl. No.: 14/085,810

(22) Filed: Nov. 21, 2013

(65) Prior Publication Data
US 2015/0117032 A1   Apr. 30, 2015

(30) Foreign Application Priority Data

Oct. 30, 2013   (TW) .............................. 102139203 A

(51) Int. Cl.
*F21V 5/04* (2006.01)
*G02B 5/02* (2006.01)
*G02B 19/00* (2006.01)
*F21Y 101/02* (2006.01)

(52) U.S. Cl.
CPC ............ *G02B 5/0268* (2013.01); *G02B 5/0226* (2013.01); *G02B 19/0061* (2013.01); *F21V 5/04* (2013.01); *F21Y 2101/02* (2013.01); *G02B 5/0278* (2013.01)

(58) Field of Classification Search
CPC ............. F21V 5/048; F21V 5/04; F21V 5/00; F21V 5/002; G02B 5/0242; G02B 5/0278; G02B 5/0268; G02B 19/0061; G02B 5/02; G02B 5/021; G02B 5/0226; F21Y 2101/02
See application file for complete search history.

(56) References Cited

U.S. PATENT DOCUMENTS

| 8,382,337 B2 * | 2/2013 | Ing ................... B29D 11/00798 313/361.1 |
| 2013/0044496 A1 * | 2/2013 | Seki ....................... H01L 33/507 362/311.02 |
| 2014/0177232 A1 * | 6/2014 | Huang ..................... F21V 5/04 362/311.02 |

* cited by examiner

*Primary Examiner* — Bao Q Truong
(74) *Attorney, Agent, or Firm* — Novak Druce Connolly Bove + Quigg LLP

(57) ABSTRACT

An optical element includes a lens and a light diffusion layer formed on the lens. The lens includes a light incident face and a light emerging face. The light emerging face includes a concave face opposite to the light incident face and a convex face surrounding the concave face. The convex face is covered by the light diffusion layer. The concave face is exposed outside the light diffusion layer. A method for manufacturing the optical element is also disclosed.

19 Claims, 5 Drawing Sheets

OPTICAL ELEMENT AND METHOD FOR MANUFACTURING THE SAME

BACKGROUND

1. Technical Field

The disclosure generally relates to optical elements and methods for manufacturing the optical elements, and more particularly, to an optical element having a light diffusion layer and a method for manufacturing the optical element.

2. Description of Related Art

Nowadays LEDs (light emitting diodes) are applied widely in various applications for illumination. The LED is a highly pointed light source. Thus, the LED is generally used with a lens to modulate the light distribution thereof. The lens can converge the light emitted from the LED to thereby produce a small light spot. However, the converging capability of the lens is insufficient such that the intensity at a center of the small light spot is not high enough.

What is needed, therefore, is an optical element and a method for manufacturing the optical element which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
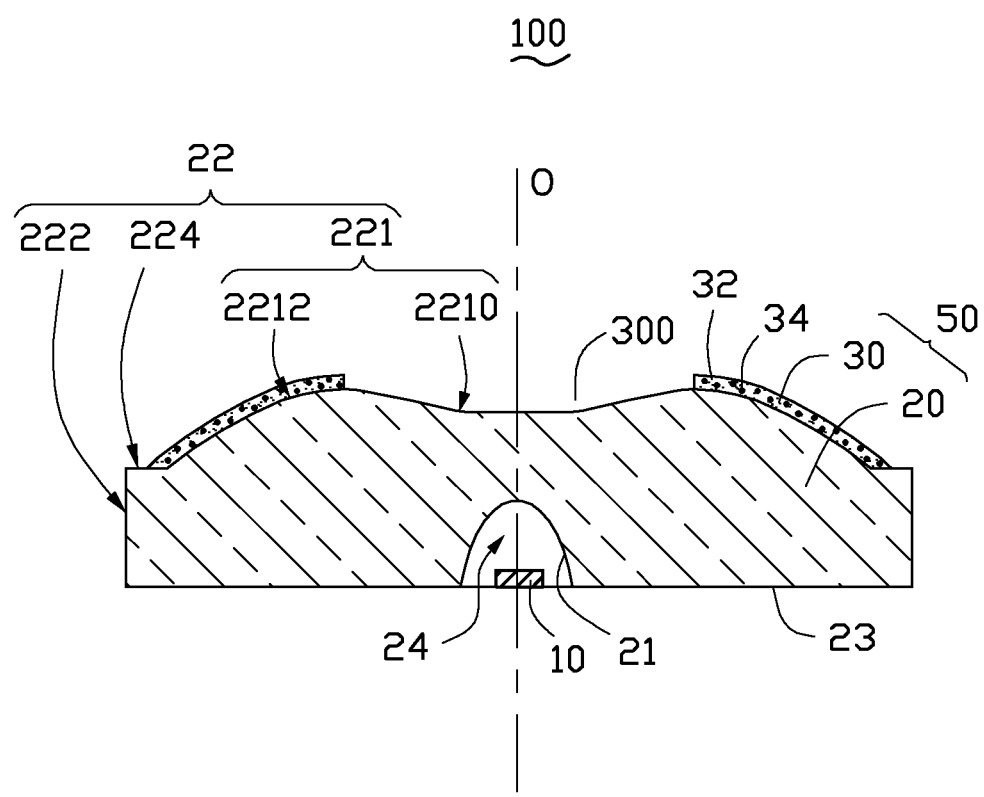
FIG. 1 is a cross section of an LED unit in accordance with an embodiment of the present disclosure.
Figure 2:
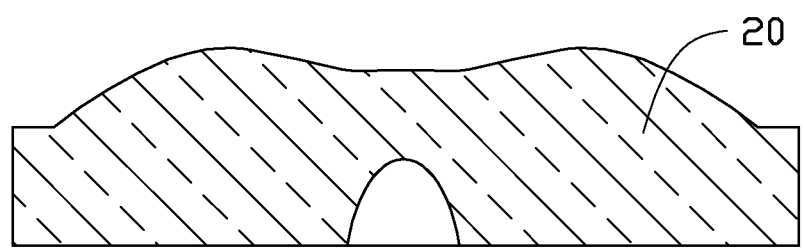
FIG. 2 shows a first step of a method for manufacturing an optical element of the LED unit of FIG. 1.
Figure 3:
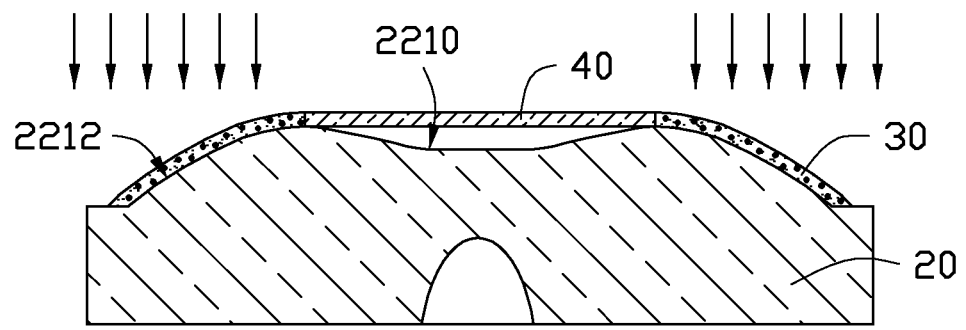
FIG. 3 shows a second step of the method for manufacturing the optical element of the LED unit of FIG. 1.

Referring to FIGS. 1-3, an LED (light emitting diode) unit 100 in accordance with an embodiment of the present disclosure is shown. The LED unit 100 includes an LED 10 and an optical element 50 covering the LED 10.

The optical element 50 includes a lens 20 and a light diffusion layer 30 formed on the lens 20. The lens 20 may be made of transparent material such as epoxy, silicone, glass or the like. The lens 20 includes a bottom face 23, a light incident face 21 formed in the bottom face 23 and a light emerging face 22 opposite to the bottom face 23. The lens 20 has an optical axis O extending through centers of the light incident face 21 and the light emerging face 22.

The bottom face 23 is a flat and circular face. The light incident face 21 is defined in a central area of the bottom face 23 and encloses a cavity 24 to receive the LED 10. The cavity 24 has a diameter gradually decreasing from the bottom face 23 towards the light emerging face 22. The light incident face 21 is an elliptical face with a long axis perpendicular to the bottom face 23, and a short axis parallel to and located within the bottom face 23.

The LED 10 is received in the cavity 24. The LED 10 may be made of semiconductor material such as GaN, InGaN, AlInGaN or the like. The LED 10 can emit visible light when being powered. In this embodiment, the LED 10 is a white LED 10. The light emitted from the LED 10 passes through the cavity 24 and enters the lens 20 via the light incident face 21.

The light emerging face 22 is located above the bottom face 23. The light emerging face 22 includes a top face 221, a flat face 224 surrounding the top face 221 and a lateral face 222 connecting the flat face 224 with the bottom face 23. The top face 221 includes a concave face 2210 and a convex face 2212 surrounding the concave face 2210. The concave face 2210 is located at a central area of the light emerging face 22 and opposite to the light incident face 21. The concave face 2210 has a curvature less than that of the light incident face 21. The convex face 2212 connects the concave face 2210 with the flat face 224. A bottom of the convex face 2212 is lower than a bottom of the concave face 2210. The flat face 224 is an annular face parallel to the bottom face 23. The flat face 224 is lower than the concave face 2210 and the convex face 2212. The flat face 224 has an area less than that of each of the concave face 2210 and the convex face 2212. The flat face 224 connects the bottom of the convex face 2212 with the lateral face 222. The lateral face 222 connects the flat face 224 with the bottom face 23. The lateral face 222 is a cylindrical face perpendicular to the bottom face 23 and the flat face 224. In this embodiment, a junction between the concave face 2210 and the convex face 2212 is smooth and curved, a junction between the convex face 2212 and the flat face 224 is abrupt, and a junction between the flat face 224 and the lateral face 222 is also abrupt. The light emerging face 22 can diverge the light from the light incident face 21 out of the lens 20, thereby illuminating a large area.

The light diffusion layer 30 is attached on the light emerging face 22. The light diffusion layer 30 is annular and covers the convex face 2212 and an inner part of the flat face 224. An opening 300 is defined in a central area of the light diffusion layer 30. The concave face 2210 is exposed outside from the opening 300 of the light diffusion layer 30. Thus, the light passing through the concave face 2210 (i.e., the light having a small angle deviated from the optical axis O) directly transmits out of the lens 20 without being diffused by the light diffusion layer 30. Particularly, a circumferential periphery of the opening 300 is coincidental with a top of the convex face 2212. An outer part of the flat face 224 is also exposed outside the light diffusion layer 30. The light diffusion layer 30 can diffuse the light passing through the convex face 2212 and the flat face 224 (i.e., the light having a large angle deviated from the optical axis O). A portion of the diffused light transmits along the optical axis O or is deviated a small angle from the optical axis O. Thus, more light is diffused by the light diffusion layer 30 to transmit near the optical axis O. Accordingly, an intensity of a center of a light distribution produced from the LED unit 100 is increased.

Figure 5:
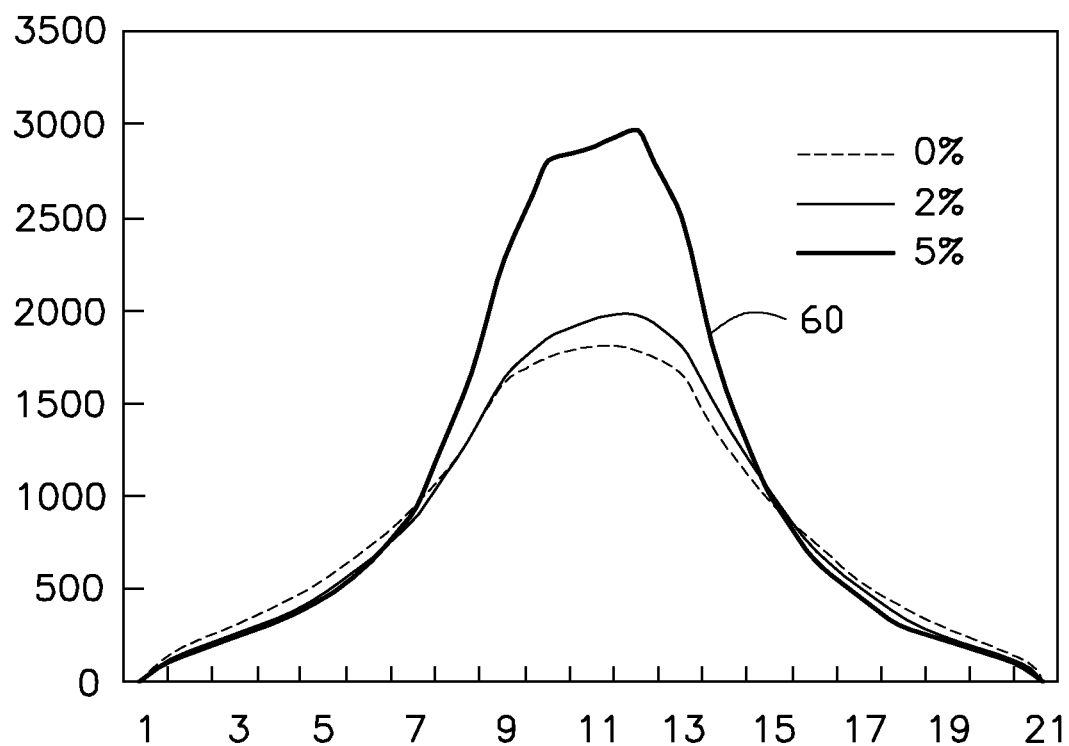
FIG. 5 shows different light distribution curves of the LED unit of FIG. 1 with different light diffusion particulate densities.

The light diffusion layer 30 includes a transparent adhesive layer 32 and a larger amount of light diffusion particulates 34 doped within the transparent adhesive layer 32. The transparent adhesive layer 32 may be a UV (ultraviolet) curing adhesive layer. The light diffusion particulates 34 may be made of silicon or polymethyl methacrylate. The light diffusion particulates 34 have an average diameter ranging between 1 μm and 5 μm. A density of the light diffusion particulates 34 determines the intensity of the center of the light distribution produced from the LED unit 100. As shown in FIG. 5, different light distribution curves 60 shows that denser light diffusion particulates 34 are used, more light are diffused to transmit along the optical axis O or be deviated a small angle from the optical axis O. Preferably, the density of the light diffusion particulates 34 of this embodiment is 5% (i.e., a total weight of the light diffusion particulates 34 relative to that of the light diffusion layer 30).

Figure 4:
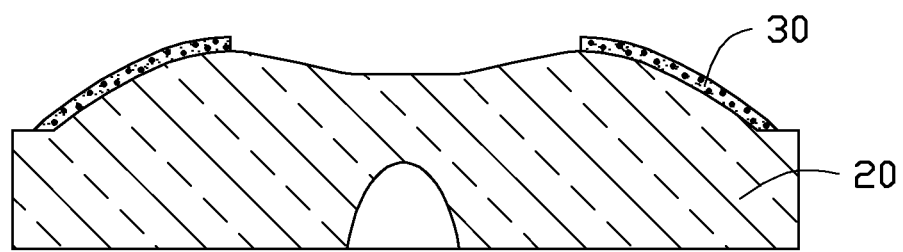
FIG. 4 shows the optical element manufactured after the steps of FIGS. 3-4.

Referring to FIGS. 2-4, a method for manufacturing the optical element 50 of the LED unit 100 is also disclosed. Firstly, the lens 20 is provided. A flat glass 40 is then placed on the light emerging face 22 of the lens 20 to cover the concave face 2210. The light diffusion layer 30 in the form of glue, is further adhered on the convex face 2212 and the inner part of the flat face 224. The flat glass 40 protects the concave face 2210 from being covered by the light diffusion layer 30. After the light diffusion layer 30 is adhered on the convex face 2212, the flat glass 40 is removed from the lens 20. UV light is finally used to radiate the light diffusion layer 30 to cure the light diffusion layer 30. Thus, the optical element 50 is manufactured.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An optical element comprising:
   a lens comprising a light incident face and a light emerging face, the light emerging face comprising a concave face opposite to the light incident face, and a convex face surrounding the concave face;
   a light diffusion layer covering the convex face, the concave face being exposed outside the light diffusion layer, the light diffusion layer defines an opening in a central area thereof, the concave face being exposed from the opening.

2. The optical element of claim 1, wherein the light emerging face further comprises a flat face surrounding the convex face, the flat face being partially covered by the light diffusion layer.

3. The optical element of claim 2, wherein the flat face is lower than the concave face and the convex face.

4. The optical element of claim 3, wherein the flat face has an area less than that of the convex face.

5. The optical element of claim 2, wherein the light emerging face further comprises a lateral face perpendicular to the flat face, the lateral face surrounding the light incident face.

6. The optical element of claim 5, wherein the lens further comprises a bottom face interconnecting the lateral face with the light incident face, the bottom face being parallel to the flat face.

7. The optical element of claim 6, wherein the light incident face is depressed from a central area of the bottom face.

8. The optical element of claim 1, wherein the concave face has a curvature smaller than that of the light incident face.

9. The optical element of claim 1, wherein the light diffusion layer comprises a transparent adhesive layer and a plurality of light diffusion particulates doped within the transparent adhesive layer.

10. The optical element of claim 9, wherein the light diffusion particulates have an average diameter ranging between 1 μm and 5 μm.

11. A method for manufacturing an optical element, comprising:
    providing a lens comprising a light incident face and a light emerging face, the light emerging face comprising a concave face opposite to the light incident face and a convex face surrounding the concave face;
    placing a protection element on the concave face;
    forming a light diffusion layer on the convex face; and
    removing the protection element and curing the light diffusion layer, the light diffusion layer defines an opening in a central area thereof, the concave face being exposed from the opening.

12. The method of claim 11, wherein the protection element comprises a flat glass.

13. The method of claim 11, wherein the light diffusion layer comprises a transparent adhesive layer and a plurality of light diffusion particulates doped within the transparent adhesive layer.

14. The method of claim 11, wherein the light emerging face further comprises a flat face connecting the convex face and a lateral face connecting the flat face, the light diffusion layer partially covering the flat face.

15. The method of claim 14, wherein the lens further comprises a bottom face connecting the light incident face with the lateral face, the bottom face being parallel to the flat face and perpendicular to the lateral face.

16. An optical element comprising:
    a lens comprising a light incident face and a light emerging face, the light emerging face comprising a concave face opposite to the light incident face, and a convex face surrounding the concave face;
    a light diffusion layer covering the convex face, the concave face being exposed outside the light diffusion layer;
    wherein the light emerging face further comprises a flat face surrounding the convex face, the flat face being partially covered by the light diffusion layer.

17. The optical element of claim 16, wherein the flat face is lower than the concave face and the convex face.

18. The optical element of claim 17, wherein the flat face has an area less than that of the convex face.

19. The optical element of claim 16, wherein the light emerging face further comprises a lateral face perpendicular to the flat face, the lateral face surrounding the light incident face.

* * * * *